May 13, 1952 — B. TOCCI-GUILBERT — 2,596,513

METHOD OF FORMING FLEXIBLE JOINTS IN BELTING

Filed Aug. 19, 1948

INVENTOR.
Berne Tocci-Guilbert
BY
Henry Gifford Hardy
attorney.

Patented May 13, 1952

2,596,513

UNITED STATES PATENT OFFICE 2,596,513

METHOD OF FORMING FLEXIBLE JOINTS IN BELTING

Berne Tocci-Guilbert, San Francisco, Calif.

Application August 19, 1948, Serial No. 45,071

5 Claims. (Cl. 154—116)

1

This invention relates to flexible points and particularly to those joints which are used for the purpose of joining together or connecting the ends of belting, particularly round and V belts of rubber, leather, rope and the like.

Although many different methods of power transmission are in use today, the belt method is still by far the most common and satisfactory for many applications. Various styles of belts and improvements therein have been utilized in attempts to overcome some of the disadvantages of the original flat type of belt. Since the efficiency of power transmission is the most important factor, continuous efforts have been made to overcome the limitations inherent in the flat type of belt with the view of increasing the traction of the belt on its pulleys. Thus the V belt and the round belt have been developed to increase the surface exposed to the pulleys and to provide improved frictional engagement with the coacting surface of the belt.

The V belt is widely and extensively used, but must be frequently replaced in service because of the excessive and uneven belt wear which is caused by the concentration of frictional forces and pressures at the bottom of the pulleys. The round belts possess most of the advantages of the V belt and in addition to providing more traction surface in contact with the pulleys, they distribute the wear more evenly because of the ability of round belts to rotate axially while driving the pulleys.

One of the major difficulties encountered with all belts and with round belts in particular, occurs when attempting to join the free ends of the belt together in a way which insures constant tension and at the same time offers a smooth bearing surface similar in size and characteristics to the belt itself. The constructions heretofore employed in joining together the ends of round belts do not provide these desirable results, and as a consequence round belts have not been extensively utilized.

A further disadvantage of conventional methods and means of splicing or joining the ends of belts results from the length of time required to effect the juncture, as well as the necessity of providing the special tools and skills which conventional joinder methods require. In most applications it is desirable to mend a broken belt or install a new one without the aid of a workman who is particularly skilled in this type of work and without the use of special tools or the expenditure of an undue amount of time.

Conventionally, joinder of round belts is made

2 by the use of metal couplings which are not flexible and which grasp the belt in such a way that when it once begins to slip, the belt gives way all at once. Furthermore, such couplings frequently possess an outside texture which is unlike the texture of the belt itself, and such conventional belt couplings are not entirely satisfactory for general use because they do not flex readily and bend to adapt themselves to the shape of the pulley.

An important object, therefore, of the present invention is to provide a connecting or joining means for round and V belts, rope and the like which corresponds as nearly as possible in both section and texture to the belt itself which at the same time is capable of joining the ends thereof in a flexible and unvarying relationship.

It is a further object of the present invention to provide a means of joining the broken or free ends of belts, etc. that can be readily employed by a workman of no more than ordinary skill and by utilizing only ordinary tools and repair materials.

It is another object of this invention to provide a coupling or joint for belts which is flexible and which will run over the pulleys in the same fashion and with the same effect as the belt itself.

Further objects are to provide a construction of maximum simplicity, economy and ease of assembly and disassembly and such further objects, advantages and capabilities as will later appear and as are inherently possessed by the device and invention described herein.

The invention further resides in the combination, construction and arrangement of parts illustrated in the accompanying drawings and while there is shown therein a preferred embodiment and one variant thereof, it is to be understood that the same are illustrative of the invention and that the invention is capable of modification and change and comprehends other details of construction without departing from the spirit thereof, or the scope of the appended claims.

Referring to the drawings.

Figure 3:
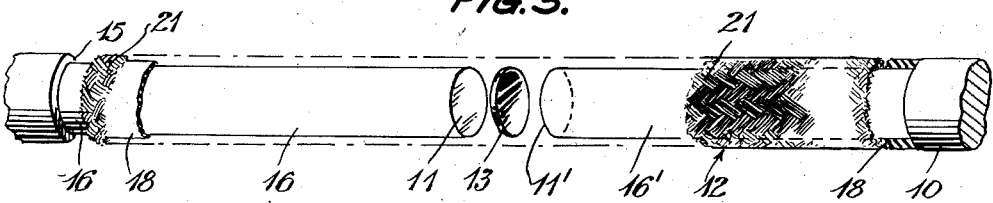
Figure 3 is a perspective view partially in section, showing the method of installation of the coupling of Figure 1.

Referring now more particularly to the drawings in which like reference numerals indicate like parts in the several views, there is shown generally at 10 a belt having two ends 11 and 11' properly squared off and inserted within the coupling 12 so as to abut the oppositely disposed surfaces of the disk 13. The coupling or joint 12 is composed of a tubular flexible braided or woven material, preferably of metal, having an external diameter approximately the same as the normal diameter of the belt 10, the ends of which are to be joined. The coupling 12 is as thick as necessary to give sufficient strength, but is kept as thin as possible in order to minimize the extent to which the belt ends 11 and 11' must be pared down to accommodate the thickness of coupling 12. As is best illustrated in Figure 3, the belt ends 11 and 11' may be cut down to form a shoulder 15 and cylindrical end portions 16 and 16' which permit the coupling 12 to surround these end portions and still not enlarge the resulting diameter substantially beyond that of the belt 10.

The disk 13 is composed of neoprene or other thermoplastic resinous material adapted to fuse with the extremities of the belt ends 11 and 11' under the action of heat. Thus, the cohesive action between the respective belt ends 11 and 11' through the fusion of disk 13, and the adhesive action of the rubber cement 18 which is applied to the surfaces of the pared ends 16 and 16' of the belt 10, combined with the constrictive action of the braided or woven coupling 12, securely hold the belt ends and form a firm continuous juncture which will withstand tension greater than that of the belt 10.

Figure 1:
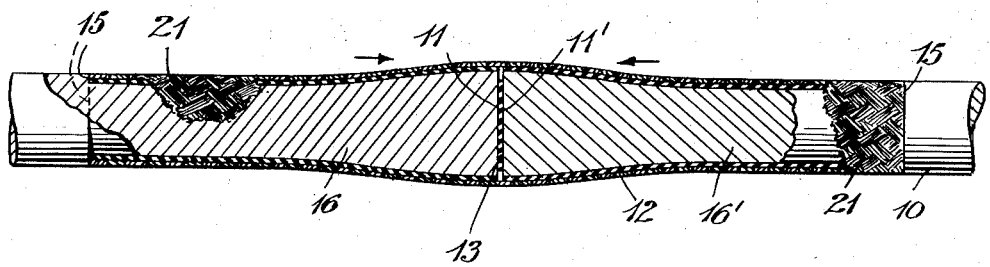
Figure 1 is an elevational view of the coupling installed on a round belt before the normal tension and position of the belt is assumed, with part of the coupling shown in section.

The tubular coupling or joint 12 being woven, permits penetration of the rubber cement 18 therethrough to its outer surface, thereby forming a locking bond with the ends 16 and 16', while at the same time creating a texture on the exterior surface of the coupling 12 which coacts with the surface of the pulleys so as to increase the frictional engagement of the joined portions to approximate that of the belt 10. The individual woven members or flat strands 21 of the coupling 12 are composed of a series of braided wires, so woven that in the normal position the strands 21 are substanially on a 90 degree bias. Elongation of the woven tubular coupling 12 constricts its diameter substantially throughout its entire length, and any shortening in the normal length thereof tends to expand the diameter substantially at the center portion of the coupling 12, as shown in Figures 1 and 4.

Figure 4:
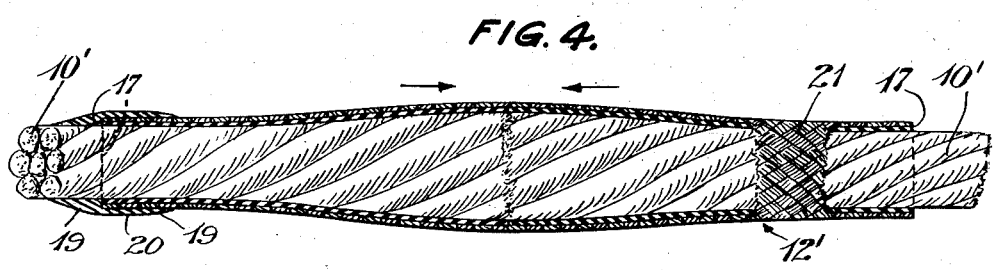
Figure 4 is an elevational cross-sectional view of the coupling installed on a rope belt or other round belt of small diameter.
Figure 5:
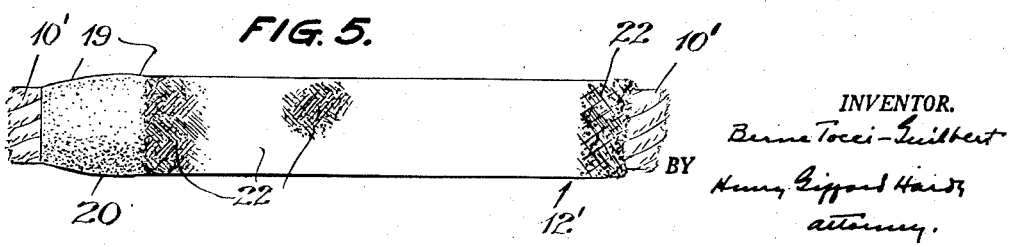
Figure 5 is a fragmentary elevational view of the coupling of Figure 4 constricted in place and ready for use.

Figures 4 and 5 illustrate the use of the coupling 12' on a belt 10' of the rope or the like, when the diameter is so small that the paring down of the belt ends 11 and 11' to accommodate the coupling 12' is not desirable or where the diameter is large enough so that a slight increase in diameter will not be detrimental. The coupling 12' employed in Figure 5 creates a shoulder 17 where it ends on the outer surface of the belt 10'. Such a shoulder 17 may have undesirable results in operation when it passes over the pulleys. Further, in order to insure that fraying of the strands 21 and loosening of the coupling 12' will not be caused during the operation of the 10', the sleeve 20 with tapered ends 19 is employed to graduate the diameter of the belt 10' to the diameter of the coupling 12. This sleeve 20 may be crimped or otherwise secured firmly in position. Alternately the tapered sleeve 20 may be formed of an adhesive or other flexible cementitious material which hardens without becoming brittle, into a graduated or tapered sleeve as shown.

*Operation*

In operation the ends 11 and 11' of the round belt 10, for example, are first pared down to form the end portions 16 and 16' so that the combined diameter of the end portions 16 and 16' and the coupling 12 closely approximates the normal diameter of the belt 10. A length of tubular woven material of sufficient length to abut the shoulders 17 at both of its free ends when in normal position, is cut to form the coupling 12. The belt ends 11 and 11' are both cut off at right angles to the axis of the belt 10 so that they will properly abut with the disk 13 when the pared ends 16 and 16' of the belt 10 are inserted into the coupling 12. The prepared surfaces 16 and 16' on both belt ends 11 and 11' are then coated with a layer of rubber cement 18 or other suitable adhesive or resinous material, and inserted, with the disk 13, into the coupling 12 with opposing longitudinal pressure, thereby causing the coupling 12 to increase in diameter at its central portion and decrease in length. At the same time and under the same pressure, the ends 11 and 11' tend to spread within the coupling 12.

Figure 2:
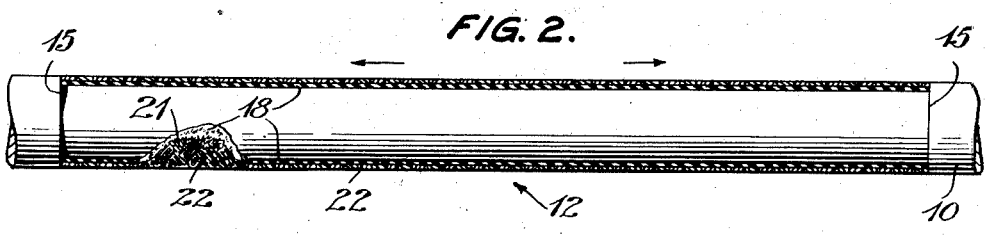
Figure 2 is an elevational view of the coupling of Figure 1 installed on a round belt and in its normal position.

When the belt ends 11 and 11' both abut with the disk 13 within the coupling 12 under pressure so that the ends tend to spread in the expanded portion of the coupling, the pressure is released and the coupling 12 allowed to return to its normal length, thereby forming a squeezing or gripping engagement with the coacting surfaces 16 and 16' of the belt ends 11 and 11'. Since these surfaces 16 and 16' are coated with rubber cement 18 or other material, and since the woven coupling 12 is permeable, the rubber cement 18 is squeezed, penetrates between the strands and dries on the outer surface thereof to form a flexible coating 22, as shown in Figures 2 and 5. Due to the action of the woven coupling, any increase in the tension on the belt 10 tending to separate the ends 11 and 11' thereof will tend to elongate the coupling 12 thereby increasing its gripping power and producing a tighter engagement with the coacting surfaces 16 and 16'.

To further secure the belt ends 11 and 11' together, heat may be applied by means such as an infra-red lamp to the juncture, thereby causing the disk 13 to melt and fuse with the belt ends 11 and 11'.

In the modified form of construction illustrated in Figures 4 and 5, no pared surfaces 16 are required and after the joinder of the ends 11 and 11' has been made with the coupling 12' a tapered sleeve 20 of metal or a suitable plastic or rubber-like material is applied to each end of the coupling 12' to form a graduated tapered connection with the adjacent belt 10.

The proportions and shapes have been exaggerated to make the explanation more clearly understood, but it is apparent that the alternate form of juncture illustrated in Figures 4 and 5 does not in fact add appreciably to the diameter.

The juncture of V belts is accomplished in the same way, using tubular woven coupling members, preferably of metal because the coupling may be shaped by flattening appropriate areas to conform with the shape of the particular type of V belting.

I claim:

1. A method of joining the ends of round belting having end portions adapted to be joined by a woven constrictable sleeve, the steps of cutting down the diameter of the abutting ends to accommodate the thickness of the sleeve, applying an adhesive coating to the said end portions to be joined, inserting the said adhesively coated end portions in the said sleeve with a fusible disk therebetween, and applying heat to fuse each of the said abutting end portions to the said disk.

2. A method of flexibly joining the ends of V belting having end portions adapted to be joined by a flexible constrictable sleeve, the steps of applying an adhesive coating to each of the said end portions to be joined, inserting the said adhesively coated end portions into the said sleeve with a fusible member between the abutting ends thereof, applying heat to fuse the said end portions to the said fusible member, and securing the ends of the said sleeve to the portions of the said belt immediately adjacent thereto, to form a flexible unitary juncture of substantially the same cross section as the V belting.

3. The method of joining round belting comprising the steps of preparing the ends to be joined, coating said portions with an adhesive material, inserting the ends into a tubular woven coupling member under opposing longitudinal pressure expanding the central portion of said member, and releasing said pressure to squeeze some of said adhesive material between the woven strands of the coupling member, forming a flexible exterior coating and restoring the normal position of said coupling member with a gripping action on said ends.

4. The method of joining belting comprising the steps of preparing the ends to be joined, coating said portions with a plastic material, inserting the ends into a tubular woven coupling member under opposing longitudinal pressure, expanding the central portion of said member, releasing said pressure to squeeze some of said plastic material between the woven strands of the coupling member, returning said coupling member to its normal position, with a gripping action on said ends and securing the ends of said coupling member to the adjacent belting in a tapering manner.

5. The method of joining round belting comprising the steps of preparing the ends to be joined by reducing their section sufficient to accommodate the thickness of a coupling member, coating said reduced end portions with a plastic material, inserting the prepared ends into a tubular woven coupling member with opposing longitudinal pressure, expanding the central portion of said member until said ends abut and tend to spread, releasing said pressure to squeeze some of said plastic material between the woven strands of the said coupling member to form a flexible coating on the exterior surface thereof, and returning said coupling member to its normal size with a gripping action on said ends to form a continuous joint of substantially the same section as said belting.

BERNE TOCCI-GUILBERT.

REFERENCES CITED

The following references are of record in the file of this patent:

UNITED STATES PATENTS

| Number | Name | Date |
| --- | --- | --- |
| 161,508 | Hare | Mar. 30, 1875 |
| 574,234 | Barnes | Dec. 29, 1896 |
| 839,260 | Benson | Dec. 25, 1906 |
| 1,530,410 | Reach | Mar. 17, 1925 |
| 1,931,322 | Kepler | Oct. 17, 1933 |
| 2,060,906 | Snyder | Nov. 17, 1936 |
| 2,189,987 | Kellems | Feb. 13, 1940 |
| 2,224,036 | Van Voorhis | Dec. 3, 1940 |
| 2,269,419 | Adler et al. | Jan. 13, 1942 |

FOREIGN PATENTS

| Number | Country | Date |
| --- | --- | --- |
| 159,762 | Great Britain | Mar. 10, 1941 |